(12) United States Patent
Blakley III et al.

(10) Patent No.: US 7,039,714 B1
(45) Date of Patent: May 2, 2006

(54) METHOD OF ENABLING AN INTERMEDIARY SERVER TO IMPERSONATE A CLIENT USER'S IDENTITY TO A PLURALITY OF AUTHENTICATION DOMAINS

(75) Inventors: George R. Blakley III, Round Rock, TX (US); Gregory Scott Clark, Austin, TX (US); Ivan Matthew Milman, Austin, TX (US); Brian Turner, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,187

(22) Filed: Jan. 19, 2000

(51) Int. Cl.
*G06F 15/16* (2006.01)

(52) U.S. Cl. ...................................................... 709/229
(58) Field of Classification Search ................. 709/229
See application file for complete search history.

(56) References Cited

U.S. PATENT DOCUMENTS 5,586,260 A * 12/1996 Hu .............................. 713/201
5,774,660 A * 6/1998 Brendel et al. ............. 709/201
6,324,648 B1 * 11/2001 Grantges, Jr. ............... 713/201

* cited by examiner

*Primary Examiner*—Ario Etienne
*Assistant Examiner*—Barbara Burgess
(74) *Attorney, Agent, or Firm*—Jeffrey S. LaBaw; Joseph R. Burwell; David Judson

(57) ABSTRACT

An enterprise computing environment such as a corporate web portal includes an intermediary server, a sign on service, and one or more backend enterprise systems managed by resource managers. Before or after user primary logon, which establishes a user primary account identity, the intermediary server uses its own identity to authenticate to the sign on service its right to retrieve user secondary account identities with respect to the backend enterprise systems. Retrieved secondary account identities are then used by the intermediary server to perform user secondary logons to respective resource managers in the environment. The intermediary server also manages the passing of resource requests and associated replies between the user and the resource managers.

21 Claims, 3 Drawing Sheets

METHOD OF ENABLING AN INTERMEDIARY SERVER TO IMPERSONATE A CLIENT USER'S IDENTITY TO A PLURALITY OF AUTHENTICATION DOMAINS

BACKGROUND OF THE INVENTION

1. Technical Field

The present invention relates generally to method of accessing resources in a distributed computer networking environment and, in particular, to a technique for enabling an intermediary server to impersonate a client user's identity to a plurality of authentication domains.

2. Description of the Related Art

Information technology (IT) systems and the Internet have fueled the growth of the current global economy. In a typical enterprise environment, however, there may be a number of different business units, each offering a different type of web-based business service or application. Thus, for example, a large enterprise may have a sales department, a service department, and so on. Each department or business unit may also have their own legacy or other backend system. Many such enterprises have provided web-based business services through distinct and often independent service offerings. Continuing with the above example, the enterprise may provide a first web-based business service through a first portal, a second web-based business service through a second portal, and so on. In such case; a given user may have multiple accounts and perhaps multiple passwords within the same enterprise as a result of the differences in backend systems, service offerings, and the like.

While these disparate systems provide users with adequate service offerings, a problem arises if the Company desires to combine these web-based business services into an integrated portal. In particular, typically there is significant user resistance to having to modify account identities and passwords once such authentication data is established and in use.

The present invention addresses this problem.

BRIEF SUMMARY OF THE INVENTION

An intermediary server operative within an enterprise computing environment acts as a gateway between a client terminal and a set of one or more backend resource managers, each of which may be associated with an authentication service. The intermediary server interfaces to a single sign-on (SSO) service, which stores authentication information (e.g., user identities and passwords) that the user of the client terminal needs to obtain access to resources managed by the resource managers. Thus, for example, the user may have a first userid/password pair to enable access to a first resource manager, and a second userid/password pair to enable access to a second resource manager, and so on. In operation, the intermediary server receives an access request and establishes the client terminal user's primary identity. By authenticating itself to the SSO service, the intermediary server uses that identity to obtain (from the SSO) a set of user secondary identities that are then used (by the intermediary server) to impersonate the user to each of the backend resource managers. Thus, from a perspective outside the enterprise, the intermediary server gives the user the appearance of having a single user account having a single password when, in fact, within the enterprise the user may have multiple accounts, perhaps with multiple passwords.

According to the present invention, the single sign-on (SSO) service, in effect, is co-opted by the intermediary server on behalf of the client terminal user to facilitate identity mapping and authentication within the enterprise environment. The invention takes advantage of the fact that the SSO service already knows what information is required to impersonate the user in the enterprise's authentication domains.

In a representative embodiment, the intermediary server is a web portal and the resource managers are legacy systems within the enterprise environment. The client terminal is connected to the web portal over a computer network, such as the Internet.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
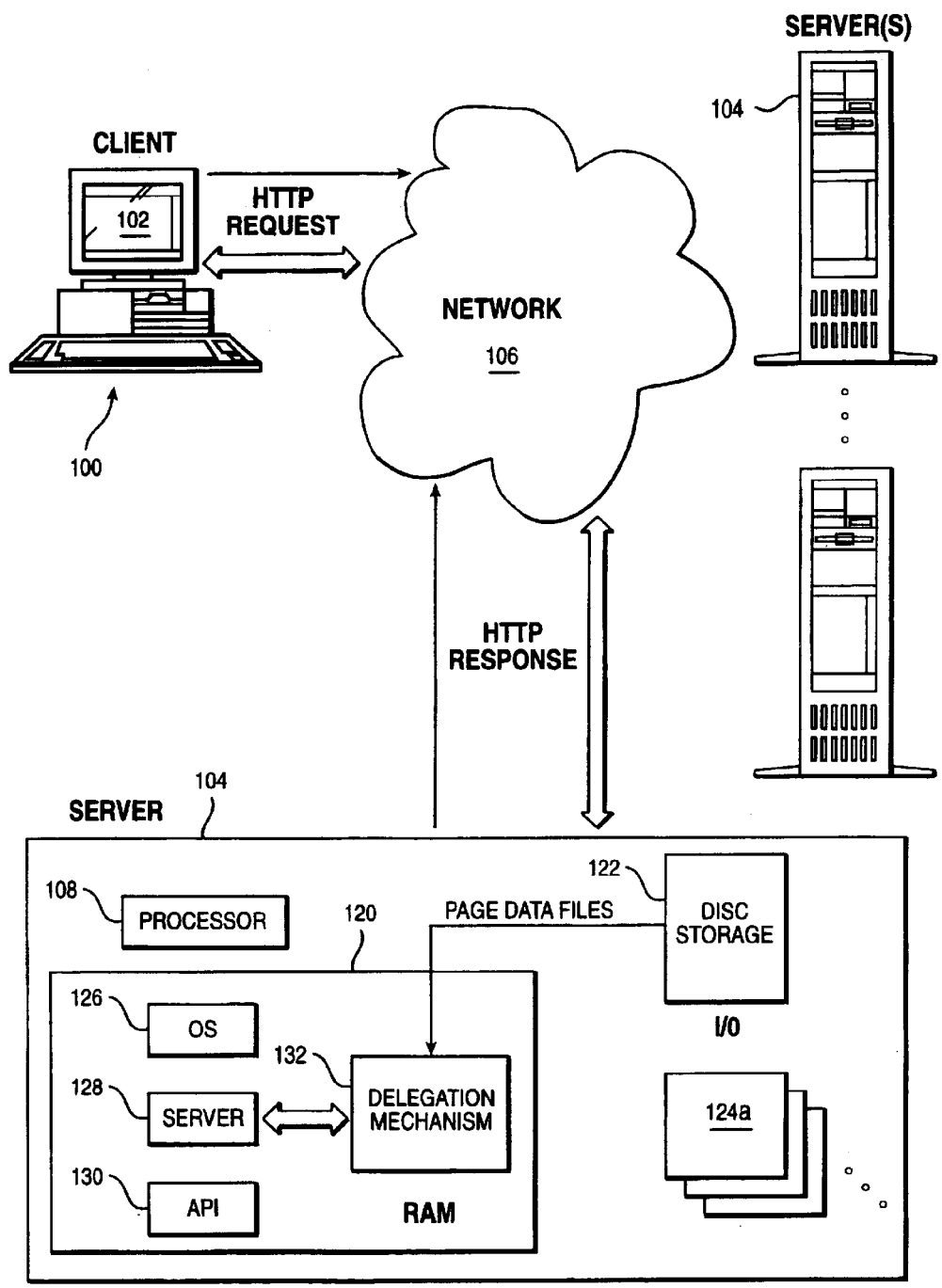
FIG. 1 is a known web-based computer environment.

The present invention may be implemented within a web-based transaction environment such as the Internet. As is well-known, in the Internet paradigm as illustrated in FIG. 1, a client machine, such as machine 100, may use an application, such as a web browser 102, to access a server 104 via a computer network 106. Network 106 typically includes other servers (not shown) for control of domain name resolution, routing and other control functions. A representative server 104 is a computer or workstation having at least one processor 108, system memory (e.g., RAM) 120, disk or other permanent storage 122, I/O devices 124a–n, an operating system 126, a server program 128, and an application programming interface (API) 130 that provides extensions to enable application developers to extend and/or customize the core functionality thereof through software programs including plug-ins, CGI programs, Java servlets, and the like. One such software program is an inventive delegation mechanism 132, which enables the server to impersonate as will be described. In an illustrative embodiment, the delegation mechanism is implemented on native code in Java executable in a processor. The inventive functionality, of course, may be part of the integral web server program.

A representative server machine is an IBM Netfinity platform running the Unix or Linux operating system and a server program such as IBM WebSphere Version 2.0 or Apache of course, any other computer hardware or software may be used.

A representative client is a personal computer, notebook computer, Internet appliance or pervasive computing device (e.g., a PDA or palm computer) that is Pentium-, PowerPC®- or RISC-based. The client includes an operating system such as Microsoft Windows, Microsoft Windows CE or PalmOS. A typical client includes a suite of Internet tools including a Web browser, such as Netscape Navigator or Microsoft Internet Explorer, that has a Java Virtual Machine (JVM) and support for application plug-ins or helper applications. Communications between the client and the server typically conform to the Hypertext Transfer Protocol (Version 1.0 or higher), and such communications may be made over a secure connection.

Figure 2:
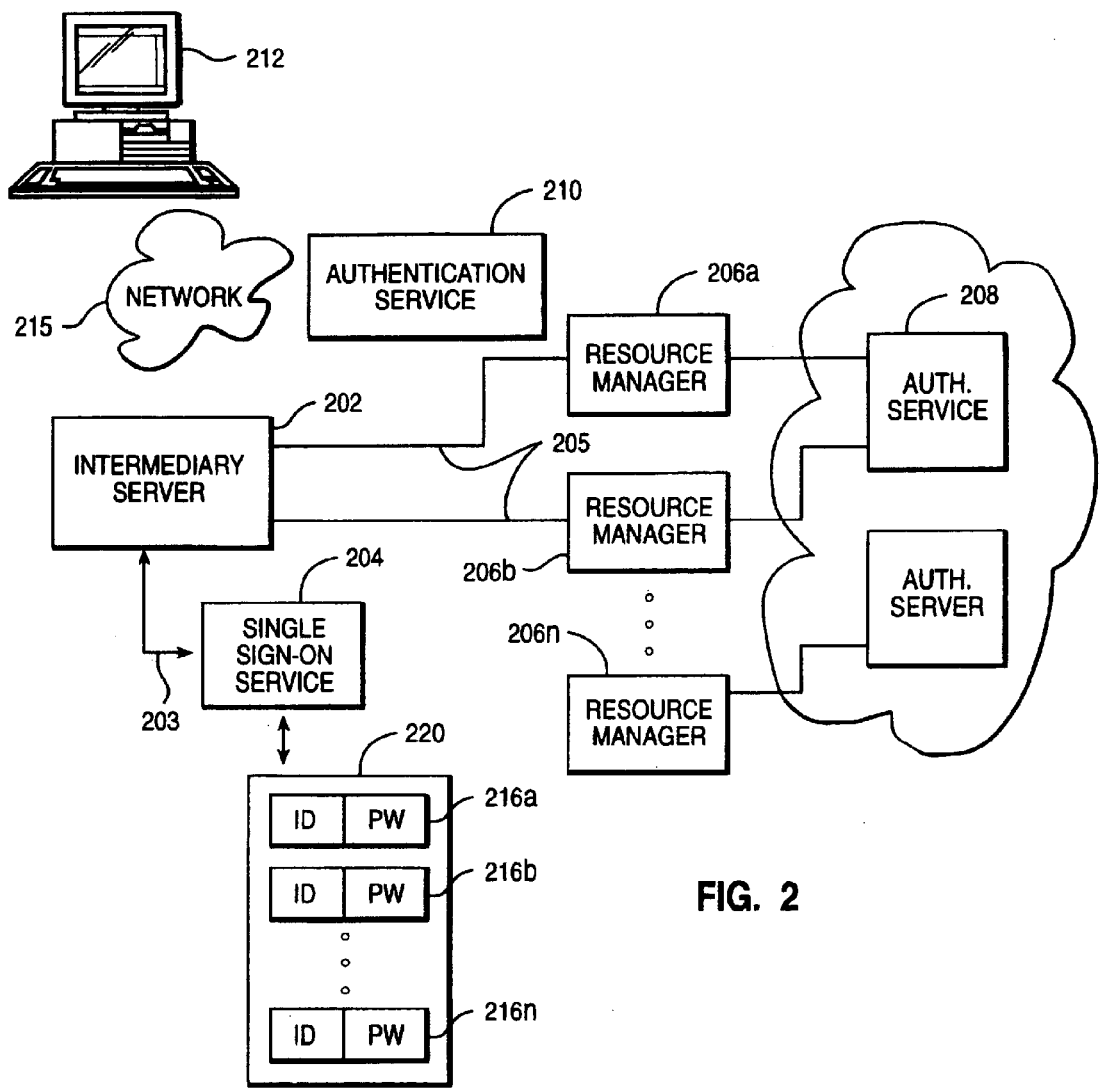
FIG. 2 is an enterprise computing environment in which the present invention is implemented using an intermediary server.

An enterprise environment 200 in which the present invention is implemented is illustrated in FIG. 2. For illustrative purposes only, the enterprise environment 200 includes an intermediary server 202, a single sign-on (SSO) service 204, and a set of one or more resource managers 206a–n. A resource manager allows access to or otherwise controls a resource. Intermediary server 202 hosts the inventive delegation functionality, as will be seen. The intermediary server 202 may be a computer dedicated to providing the inventive functionality, or it may be an adjunct to another computer. In the preferred embodiment, the server 202 is a web server and the delegation functionality is implemented in software, for example, as a set of program instructions executable in one or more processors of the web server. As illustrated in FIG. 2, intermediary server 202 is connected to SSO service 204 over link 203 which, in a representative embodiment, is a mutually authenticated Secure Sockets Layer (SSL) session, a Kerberos session, or any other known or later-developed secure link. Alternatively, the link 203 may be insecure, in which case the intermediary server 202 and the SSO service 204 may communicate by encrypting communications using, for example, an asymmetric key encryption technique. A representative technique is PGP™ (Pretty Good Privacy).

Resource managers 206 typically are servers, and a given resource manager 206 typically has associated therewith an authentication service 208. In the illustrated embodiment, a given resource manager is a computer or process that interfaces to other resources (e.g., databases, storage devices, or the like) in a legacy system within the enterprise. Given resource managers 206 may share an authentication service 208. Intermediary server 202 may also have an authentication service 210 associated therewith. Authentication service 210 may be the same as service 208, but generally is a separate service. SSO service 204 may also include an authentication service. Preferably, intermediary server 202 is connected to a given resource manager 206 via secure link 205, e.g., an SSL session, a Kerberos session, or the like.

A client terminal 212 accesses the intermediary server 202 via a computer network 215, e.g., the Internet, an intranet, a virtual private network, or the like. As described above, the client terminal is a computer, e.g., a personal computer, a laptop computer, a handheld device having a wireless Internet connection, an Internet appliance, or the like. In an typical transaction, the intermediary server is a web server or portal that is accessed via a URL in a known manner. For purposes of illustration, it is assumed that an authorized user of resources in the enterprise computing environment has a first user identity/password pair 216a for use in an authentication domain managed by a first resource manager 206a, a second user identity/password pair 216b for use in an authentication domain managed by a second resource manager 206b, and so on. As used herein, a "user" may be a person or program having an identity that is capable of being authenticated. An authentication domain is a set of servers that accept given credentials, or more generally, a collection of systems that share a single source of administrative responsibility for the assertion of given access privileges. The user identity/password pairs 216 are stored in a database 220 associated with or part of the SSO service 204. One of ordinary skill in the art will appreciate that other types of user authentication information may be used in lieu of or in addition to the user identity/password pairs 216 depending on the nature of the authentication service(s) used to validate that the user is who he or she claims to be.

Figure 3:
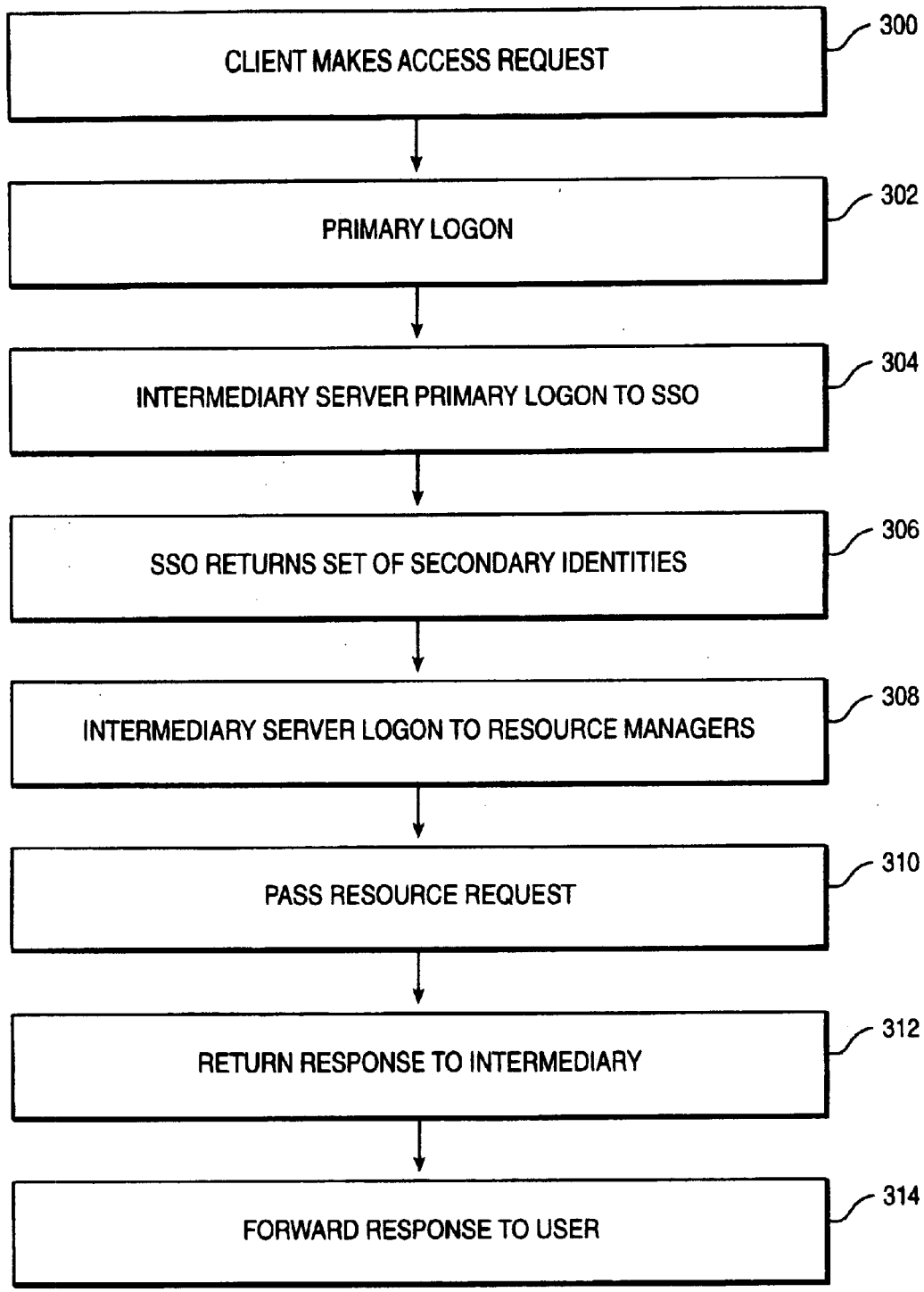
FIG. 3 is a flowchart illustrating a transaction flow according to the invention.

FIG. 3 is a flowchart illustrating a representative transaction flow according to the present invention. The transaction flow begins at step 300 with a user of the client terminal (who claims an identity) making a request to access a resource within the enterprise environment. At step 302, the user is authenticated by the intermediary server 202. Typically, intermediary server 202 uses authentication service 210 to verify that the user is who he or she claims to be. The process of authenticating the client terminal user to the intermediary server is sometimes referred to as a "primary" logon, for reasons which will become clear. As a result of the user authentication, the intermediary server 202 establishes a user primary "identity" (or "primary account identity"). As will be seen, the intermediary server continues to handle responses and requests between the client and resource managers after the original logon. At step 304, the intermediary server 202 itself performs a "primary" logon to the SSO service 204 via the secure link 203. In particular, at step 304, intermediary server 202 goes to the SSO service 204 (under its own identity) for the purpose of authenticating its right to retrieve the user's authentication information (with respect to the resource managers 206) from the SSO service. It should be noted that step 304 may take place at any time (e.g., before or after the client terminal user performs a primary logon to the intermediary server). Thus, at step 306, the intermediary server 202 passes the user's primary account identity to the SSO service 204. If the identity of the intermediary server 202 is validated, the intermediary server receives, in return, a set of user secondary identities (or "secondary account identities"). This is sometimes referred to as identity mapping and secondary authentication information retrieval. An illustrative user secondary identity is an user identity/password pair 216a stored in the database 220 for use in authenticating the user to a given resource manager 206a.

Generally, once the intermediary server has established its identity (with the SSO), it can be used to perform user secondary logons for any user. If desired, the SSO may include a set of mappings identifying the users for which the user is allowed to perform secondary logons. This would provide an added layer of security.

Returning back to FIG. 3, the transaction flow then continues at step 308, with the intermediary server 202 performing a single sign-on to the set of resource managers 206 using the set of user secondary account identities. Each logon from the intermediary server 202 to a respective resource manager via a preferably secure link 205 is sometimes referred to as a secondary logon (as contrasted with the primary logon of the user to the intermediary server 202). Thus, for example, in step 308, the intermediary server uses a first user secondary identity 216a to perform a secondary logon to resource manager 206a, a second user secondary identity 216*b* to perform a secondary logon to resource manager 206*b*, and so on. The secondary logons may occur sequentially or concurrently.

At step 310, after at least one or more of the secondary logons ate complete, the resource request is passed to a given resource manager under the respective user secondary identity that is required to access the required resource. At step 312, a response generated by the given resource manager is returned to the intermediary server. At step 314, the response is forwarded from the intermediary server back to the client terminal to complete the transaction flow. Steps 310–314, of course, may be repeated as often as necessary (e.g., using different user secondary identities with respect to different resource managers). Thus, for example, a first user request may be directed to a first resource manager 206*a* under a first user secondary identity 216*a*, a second user request may be directed to a second resource manager 206*b* under a second user secondary identity 216*b*, and so forth.

Thus, according to the present invention, the intermediary server is provisioned with a delegation functionality, namely, the ability to access and use the SSO to map the user's primary account identity to the user's secondary account identities with respect to the different resource managers within the enterprise environment.

In the preferred embodiment, a user approaches the enterprise and claims an identity. The intermediary server challenges the user to authenticate himself/herself. Upon user primary logon (which establishes a user primary account identity), the intermediary server uses its own identity to authenticate (to the SSO) its right to retrieve the user secondary account identities which, upon retrieval, will then be used by the intermediary server to perform user secondary logons to the respective resource managers. A preferred technique for mapping a user primary account identity to a set of user secondary account identities is via a table lookup in the SSO database. Any other convenient technique may be used. Thus, once trusted intermediary server is connected to the SSO service over the mutually authenticated secure link, the server authenticates itself, and then retrieves the user's authentication data with respect to the backend enterprise systems (managed by the resource managers).

Figure 4:
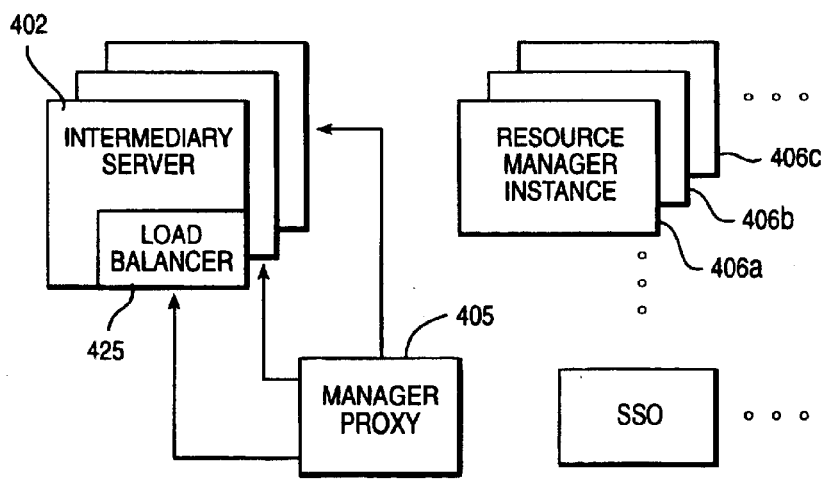
FIG. 4 is an alternative embodiment of the invention illustrating a high availability, load-balanced architecture for the delegation functionality.

The enterprise illustrated above, wherein the intermediary server is a web portal and the resource manages are backend legacy systems, is merely representative. The entire enterprise (including the backend systems) may be based on proprietary or open protocols or, as illustrated, on combinations thereof. In a preferred embodiment, one or more of the resource managers may be replicated or mirrored, e.g., by a caching appliance. When multiple copies (or "instances") of a given resource manager exist, the intermediary server 402 may include an appropriate load balancing routine, such as routine 425 in FIG. 4, to manage how requests from multiple users (each having a user primary account identity) are serviced by the particular resource manager 406. In this example, it is assumed that there are three (3) instances 406*a*, 406*b* and 406*c* of the resource manager. The load balancing routine may implement any convenient load balancing function, e.g., round robin, to direct user requests to the resource manager instances. A preferred load balancing routine is a "least busy" routine wherein the routine 400 keeps track of how many requests have been sent to the resource manager instances and sends a "next" request to the instance of the resource with the fewest uncompleted, outstanding requests. As also illustrated in FIG. 4, the intermediary server 402 itself may be replicated or mirrored and then managed by a proxy 405 that manages the set of intermediary server instances. This provides a "high availability" architecture that is readily scalable. In this embodiment, the multiple instances of the intermediary server need not keep track of which resource managers their counterparts send tasks. Each of the intermediary server instances could be coupled to all of the resource managers or a subset thereof. In an illustrative embodiment, pairs of intermediary servers are assigned a set of resource managers, e.g., a first pair of servers are assigned a first set of resource managers, a second pair of servers are assigned a second pair of resource managers, and so on.

In an illustrative embodiment, the single sign-on service is any commercially available or proprietary sign-on service. A representative service is IBM Global Sign-On (GSO). Further details about IBM GSO are available from IBM's Internet web site.

The present invention enables a web-based business with disparate backend systems to create an integrated portal wherein users can have multiple account identities/passwords within the enterprise yet present a single user account paradigm to the outside world. Thus, for example, a user may have different accounts with a financial institution and desire to have different passwords for each account (e.g., a savings account, a checking account, or the like). Another example would be where a first company purchases a second company and desires to merge its backend computer systems. In such case, the merged entity may use the present invention to enable users to maintain their original access information via an integrated interface but provide appropriate backend processing to manage the accounts as necessary.

Having thus described our invention, what we claim as new and desire to secure by letters patent is set forth in the following claims:

What is claimed is:

1. A method of enabling a client terminal user to access target resources managed by a set of resource managers within an enterprise computing environment, comprising:

authenticating the user to establish a user primary identity;

mapping the user primary identity to a set of user secondary identities;

authenticating the user to the resource managers using the set of user secondary identities;

following authentication using the set of user secondary identities, forwarding resource requests to the resource managers; and returning replies received from the resource managers back to the user.

2. The method as described in claim 1 wherein the user primary identity is mapped to the set of user secondary identities by a sign-on service.

3. The method as described in claim 2 further including the step of authenticating a trusted server to the sign-on service prior to mapping the user primary identity to the set of user secondary identities.

4. The method as described in claim 3 wherein the trusted server is authenticated to the sign-on server before the step of authenticating the user to establish the user primary identity.

5. The method as described in claim 3 wherein the trusted server is authenticated to the sign-on service after the step of authenticating the user to establish the user primary identity.

6. The method as described in claim 3 wherein the user is authenticated to establish the user primary identity using an authentication service associated with the trusted server.

7. The method as described in claim 1 further including the step of load balancing resource requests across a set of instances of a given resource manager.

8. The method as described in claim 1 wherein the client terminal user accesses the enterprise computing environment over the Internet.

9. The method as described in claim 1 wherein the user is authenticated to a given resource manager using an authentication service associated with the given resource manager.

10. A method for enabling a client terminal user to access target resources managed by a set of resource managers operative within an enterprise computing environment, wherein the environment has an associated sign-on service, comprising:
- responsive to a request received from a user of the client terminal, authenticating the user to establish a user primary identity;
- using the user primary identity, accessing the sign-on service to retrieve a set of stored user authentication information, wherein the stored user authentication information comprises a set of user secondary identities;
- performing a sign-on to the set of resource managers using the retrieved set of user secondary identities; and
- forwarding the request to a given resource manager; and
- forwarding a reply received from the given resource manager back to the user.

11. A method for enabling a client terminal user to access target resources managed by a set of resource managers operative within an enterprise computing environment, wherein the environment has an associated sign-on service, comprising:
- having the client terminal user perform a primary logon to an intermediary server to establish a user primary identity;
- having the intermediary server pass the user's primary identity to the sign-on service and, in response, obtaining a set of user secondary identities that may be used in enabling the intermediary server to represent the client terminal user to the resource managers;
- having the intermediary server perform a secondary logon to a first resource manager using a first user secondary identity;
- having the intermediary server perform a secondary logon to a second resource manager using a second user secondary identity;
- having the intermediary server perform resource requests at the first and second resource managers under the respective secondary identities; and
- forwarding responses back to the client terminal user.

12. An enterprise computing environment having a set of resource managers and a sign-on service, the enterprise computing environment comprising:
- means for authenticating a user to establish a user primary account associated with a user primary identity;
- means for cooperating with the sign-on service to map the user primary account to a set of user secondary accounts associated with a set of user secondary identities;
- means for logging onto the set of resource managers using the user secondary accounts; and
- means for passing resource requests from the user to the resource managers under the user secondary accounts.

13. The enterprise computing environment as described in claim 12 wherein the server passes replies to the resource requests back to the user.

14. A server for use in an enterprise computing environment having a set of resource managers and a sign-on service, comprising:
- means for authenticating a user to establish a user primary account associated with a user primary identity;
- means for authenticating the server to the sign-on service;
- means for logging onto the set of resource managers using a set of user secondary accounts returned from the sign-on service, wherein the set of user secondary accounts is associated with a set of user secondary identities; and
- means for passing resource requests and associated replies between the user and the resource managers.

15. The server as described in claim 14 further including means for load balancing resource requests passed to a set of instances of a given resource manager.

16. A system, comprising:
- a set of resource managers;
- a sign on service;
- a server, comprising:
- means for authenticating users to establish user primary accounts associated with user primary identities;
- means for logging a given user onto the set of resource managers using a set of user secondary accounts for the given user retrieved from the sign on service, wherein a set of user secondary accounts for a given user is associated with a set of user secondary identities for a given user; and
- means for passing resource requests and associated replies between the given user and the resource managers.

17. The system as described in claim 16 wherein at least one resource manager comprises a set of instances.

18. The system as described in claim 17 wherein the server further includes means for load balancing resource requests across the set of instances.

19. The system as described in claim 16 wherein the server comprises a set of instances.

20. The system as described in claim 19 further including a manager that manages the set of server instances.

21. A computer program product in a computer-useable medium executable in a processor of a server, comprising:
- means for authenticating a user to establish a user primary account associated with a user primary identity;
- means for authenticating the server to a sign-on service;
- means for logging onto a set of resource managers using a set of user secondary accounts returned from the sign-on service, wherein the set of user secondary accounts are associated with a set of user secondary identities; and
- means for passing resource requests and associated replies between the user and the resource managers.

* * * * *